May 8, 1962 R. E. NEITZEL 3,032,977
CORRELATED BYPASS INLET AND OUTLET CONTROL FOR
A SUPERSONIC REACTION POWERPLANT
Filed June 5, 1958
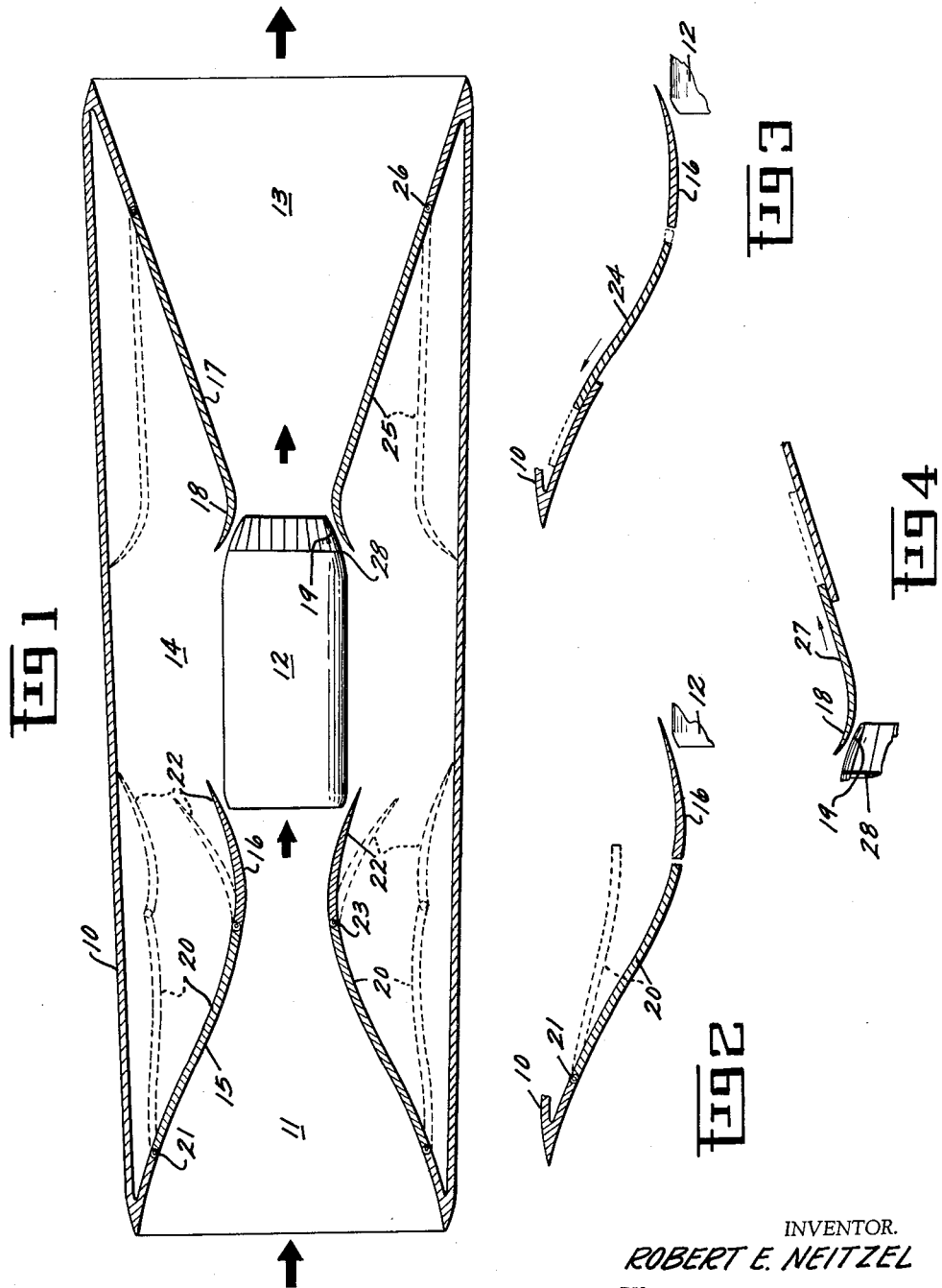
INVENTOR.
ROBERT E. NEITZEL
BY
ATTORNEY United States Patent Office 3,032,977
Patented May 8, 1962

3,032,977
CORRELATED BYPASS INLET AND OUTLET CONTROL FOR A SUPERSONIC REACTION POWERPLANT
Robert E. Neitzel, Cincinnati, Ohio, assignor to General Electric Company, a corporation of New York
Filed June 5, 1958, Ser. No. 740,111
13 Claims. (Cl. 60—35.6)

The present invention relates to a supersonic powerplant and, more particularly, to an inlet, bypass, and exit arrangement for a high supersonic flight speed air breathing reaction powerplant.

In supersonic powerplants, such as those designed to operate at Mach 3 and up, the conventional practice is to design the powerplant for the highest flight speed for which it will be used, which is normally called the design point, or design speed. Since the vehicle is often required to be self-accelerating, that is it starts from a stationary position and accelerates to design speed, it follows that a good part of its operation and performance occurs below the design point flight speed. This creates problems since the best design characteristics for the high flight speed or the designed flight speed are different from those desired below the design speed. In the case of the inlet, the gas generator portion of the propulsion system, which may be a turbojet, turbofan, or similar arrangement, is usually not capable of handling all the air which the inlet is able to capture within its frontal area at those flight speeds below the design point. A conventional way of handling this problem is to design an inlet with external compression so that the unwanted air is spilled around the inlet at the lower flight speeds. This solution has shortcomings in that there is usually cowl drag associated with the external compression inlet and the spillage around the inlet causes additional drag at reduced speed. In the case of the exit, a converging-diverging jet nozzle with a large maximum area is desired at the high speed design point in order to achieve maximum thrust. However, this area is usually far too large for reduced flight speeds because the flow passing through the engine or powerplant will not fill up the exit area. The result is an over-expansion of the fluid and poor nozzle performance at low flight speed. The solution to this problem, to avoid the severe thrust losses caused by inefficient performance at the low flight speeds, has been to use a less efficient nozzle at the design point in order to favor the low flight speed performance. Another solution has been to physically reduce the maximum area of the jet nozzle. This may be done, but it introduces complexities in the hardware required in a variable area nozzle and also causes boat-tail drag.

As a result, the design of such a supersonic or high Mach powerplant has generally been a compromise in order to achieve satisfactory performance over the complete flight range. Since the accelerating portion or the off-design part of the range is a major portion of the mission, it has been necessary to compromise the nozzle performance at the design point and accept lower efficiency and consequently lower thrust. At the same time, since the design point is an important part of the mission, these compromises have been made to provide fairly efficient operation at the design point which has resulted in accepting less than the best design features for the subsonic or accelerating portion of the mission. In other words, one feature has been to accept the too-large exit area for satisfactory sub-sonic operation in order to obtain better design point operation. Even with this, the exit area, as a typical example, is still not designed completely for maximum performance at the high flight speed. Thus, the best performance of the nozzle is sacrificed at both ends of the flight path, the accelerating or subsonic portion and the design or supersonic portion.

The main object of the present invention is to provide a supersonic powerplant that aims at improving the efficiency in both the subsonic and the supersonic regions and doing this without the mechanical complexities normally associated with this object.

A further object is to provide such a powerplant that can be operated efficiently at low speeds without the spillage and drag problem normally encountered.

Another object is to provide such a powerplant that permits the use of large nozzle exit areas by solving the over-expansion problem normally associated with such nozzles at low pressure ratios, or at low speed. Thus, increased efficiency is obtained at the design point.

A further object is to provide such a powerplant wherein the jet nozzle performance at low flight speeds is efficient without providing for a variable jet nozzle exit.

Still another object is to provide such a powerplant wherein the variable geometry required results in good performance of the inlet and exit at zero flight speeds as well as at design point flight speeds.

Briefly stated, in accordance with one aspect of my invention, I provide a supersonic powerplant having an inlet, a by-pass, a gas generator, and an exit nozzle with a fixed exit area. The walls of the inlet and exit are moveable to permit incoming air to be by-passed around the gas generator as well as passing through the gas generator at the low or off design flight speeds and to pass through the gas generator only, at the high or designed flight speeds. By this means, I avoid the spillage and associated drag by permitting all, or a major portion of, the air to be taken on board the powerplant as determined by the capture area of the inlet. In addition, I avoid the over-expansion problems associated with low speeds in a nozzle that is large enough to sufficiently handle the high flight speeds. While the preferred embodiment has been disclosed as an internal compression type of inlet, it will be apparent that an external compression or spike inlet may be applicable to the invention. It will also be apparent that center body nozzles such as a plug may be used with the invention as disclosed.

While the specification concludes with claims particularly pointing out and distinctly claiming the subject matter which I regard as my invention, it is believed the invention will be better understood from the following description taken in connection with the accompanying drawing in which:

FIGURE 1 is a schematic cross-section of a typical powerplant in accordance with the instant invention;

FIGURE 2 is a partial schematic modification of the inlet;

FIGURE 3 is a further modification of the inlet; and,

FIGURE 4 is a partial schematic modified type of outlet or nozzle.

Referring first to FIGURE 1, the general arrangement of the supersonic powerplant is shown as comprising an outer casing 10 which may take any suitable form, the form shown being a generally circular type of engine housing, although it is to be understood that the term casing is intended to include rectangular or non-circular shapes as well as two dimensional shapes in which casing 10 may form the upper and lower surfaces of a wing. Disposed within the casing 10 is an inlet section 11, a gas generator 12, and an outlet or nozzle section 13. A central passage thus connects the inlet and outlet. As mentioned above, the inlet 11 may employ a center body or spike for external compression if desired, although an internal compression inlet as illustrated is preferred. Similarly, the outlet or nozzle section 13 may employ a center body or plug if desired although the type shown is preferred. Within the spirit of the invention either of these modifications may be employed. The gas generator 12 may take the form of any internal combustion type of generator such as a turbojet engine. In order to provide for by-pass of the incoming fluid such as air, gas generator 12 is spaced from casing 10 to provide a by-pass duct 14 between the casing and the gas generator. Normally, no burning will take place in the by-pass duct. While I have shown the gas generator symmetrically disposed within the casing 10 in the central passage, it is to be understood that it need not by symmetrical and may be placed to one side as determined by the particular installation. For example, in a wing installation, it may be necessary to place the gas generator at one side of casing 10 and permit the by-pass 14 to be all on one side of the generator.

It will be noted that the preferred embodiment shown employs an internal compression inlet wherein all the air encountered by the powerplant as circumscribed by the capture area is taken on board. In addition, the powerplant is shown as employing a fixed exit area nozzle which is desired for simplicity. Furthermore, a single gas generator 12 is shown although it will be appreciated that multiple gas generators may be employed. For example, if the FIGURE 1 illustration is treated as a wing installation, multiple gas generators may be placed adjacent to each other in which case the FIGURE 1 illustration may be taken as a wing cross-sectional end view with the additional gas generators falling behind generator 12.

The inlet section or portion 11 consists of a supersonic section 15 and a sub-sonic or diffusion section 16 to diffuse the air flow and reduce its velocity for burning in generator 12. Similarly, the nozzle section 13 may consist of a diverging portion 17 for operation at the high flight design condition and may, if desired, to avoid losses, be provided with a converging section 18 to form a continuation of converging nozzle 19 on the gas generator 12. While converging section 18 is not necessary, it is preferred as shown to avoid losses that would be encountered with a sharp edge.

At the off-design condition or at lower flight speeds during acceleration, in order to spill the excess air that is taken on board which cannot be handled by the gas generator, the inlet section 11 is provided with moveable flaps 20 or equivalent mechanical structure to by-pass some of the inlet air. Thus all the air taken in by the capture area is handled by the powerplant, some of it being by-passed at the low flight speeds where the excess air cannot be efficiently handled by the gas generator. In order to vary the inlet and spill the undesired air, flaps 20 may take a convenient form as shown wherein they are pivoted at 21 to enable them to open in the downstream direction. In the embodiment shown in FIGURE 1, the sub-sonic section 16 is similarly constructed by utilizing flaps 22 pivoted at 23 to flaps 20. In the construction shown, the air may be spilled by operating the flaps to the dotted line positions shown or any intermediate position required for the particular flight conditions. The intermediate positions permit selective distribution of air to the by-pass duct and gas generator. It will be appreciated that, while a symmetrical arrangement is shown, single flaps may be employed to vary the inlet and permit the by-pass on one side only. If desired, the incoming air may be bled into the by-pass duct by the means shown which would direct the subsonic flow into the by-pass. Alternatively, as shown in FIGURE 2, the bleeding may take place in the supersonic region wherein only flap 20 is moved around pivot 21 to the dotted line position as shown in FIGURE 2 in which case the supersonic air is directed into the by-pass duct. By the same token, the supersonic section 11 may be held fast, and the sub-sonic flaps 22 may be varied as about pivot 23, shown in the lower half of FIGURE 1, to open up the diffusing or sub-sonic section as shown in the dotted line portion to direct a portion of the sub-sonic air into the by-pass duct 14. Any of these modifications are satisfactory. The basic object of the invention is to provide an inlet which is opened to permit by-pass air to flow into by-pass duct 14. An extra advantage of this arrangement permits the withdrawal of the boundary layer air on the inlet to direct it into the by-pass duct and keep it away from the gas generator 12 where it can adversely affect the efficiency of the gas generator. This same air may then be used for cooling in the jet nozzle. It will be appreciated that different mechanical arrangements may be used to obtain the same results and one of these is shown in FIGURE 3 wherein a slidable member 24 may be moved forwardly, or aft if desired, to open up the side wall and permit the inlet air to be selectively divided, passing part of it into the by-pass duct 14. The FIGURE 3 modification may be applied to either the supersonic or sub-sonic sections, or both.

When the air is directed into the by-pass duct 14, as well as the gas generator 12 at the lower speeds or accelerating flight conditions, it is desirable to use this air in the exhaust nozzle for maximum efficiency. To this end, the nozzle section may comprise similar flaps 25 pivoted at 26 to open up the nozzle section in the forward or upstream direction to direct the by-pass fluid into the nozzle section 13. Flaps or walls 25 again may take a number of suitable mechanical arrangements of which only one is illustrated in FIGURE 1 and others are obvious. A typical modification is shown in FIGURE 4 wherein a sliding wall 27 may be used to open up the wall portion of the exhaust nozzle. In either case, converging section 18 may be provided if desired to reduce losses although the powerplant will operate without section 18.

In order to obtain the proper matching characteristics in the gas generator 12, it may be desirable to provide a variable area nozzle on the downstream end of the gas generator, which, for example, may take the form of flaps pivoted at 28. Since the gas generator has its own characteristics such as requiring a certain throat area in the nozzle, it automatically sets the back pressure on the gas generator which, if a turbo-jet engine is used, sets the turbine temperature. Thus, it is important that the adjustment be correct to have proper operation of the gas generator and this can be obtained conveniently by variable area nozzle 19 consisting of flaps mounted at 28 on any suitable equivalent arrangement. Obviously suitable equivalents may take the general form shown in FIGURES 3 and 4.

The arrangement described for the exhaust nozzle section has an inherent advantage even in the closed or semi-closed position shown in dotted lines since the by-pass air may be used for cooling the flaps or wall portions 25 by bleeding through the walls 25 or by permitting a slight opening between 18 and 19 to bathe the inner surface of flaps 25 with cool air.

In operation, at low or off-design flight speeds, the incoming air is divided to selectively by-pass part of it through duct 14 by moving the inlet walls to the position shown by the dotted lines in FIGURE 1. At the same time, the exhaust nozzle is moved to open in the upstream direction as shown by the dotted lines in FIGURE 1. Thus, all the air taken aboard is used efficiently, the gas generator handling what it is efficiently able to handle and the remainder being by-passed to the nozzle to avoid over-expansion at low speeds. At high flight speeds or design speed, the flaps or equivalent structure in both the inlet and exhaust nozzle sections are closed down as shown by the solid lines in FIGURE 1, so that all, or substantially all, of the incoming air is passed through the gas generator and exhausted through nozzle section 13 to provide for efficient operation and a nozzle configuration that is best for the design speed. The fixed exit area of the nozzle provides for simplicity of operation. There are no sealing problems of any great consequence and the air in the by-pass duct 14 is generally at a higher pressure than that in the main or central duct to the gas generator thus ensuring flow inwardly at all times.

Since the adjustable features of the inlet and nozzle permits setting at any intermediate position, it is possible to bleed at the high flight design speed a small amount in the inlet and use it for cooling purposes in the nozzle.

The supersonic powerplant disclosed provides for complete flexibility and matching of the flow characteristics of both inlet and exit. This permits a desirable level of thrust over the complete range of flight speeds by matching the flow characteristics and thrust characteristics regardless of the gas generator used or the particular type of inlet or exhaust nozzle used.

While I have hereinbefore described a preferred form of my invention, obviously many modifications and variations of the present invention are possible in the light of the above teachings. It is therefore to be understood that within the scope of the appended claims the invention may be practiced otherwise than as specifically described.

I claim:

1. A reaction powerplant comprising, a casing defining a passage having a forwardly directed fixed air inlet section and a rearwardly directed fixed outlet section, a gas generator means disposed in the passage and spaced from the casing to define a by-pass duct, variable means in said inlet section to selectively direct a primary air flow through the gas generator means together with a secondary by-pass air flow through the by-pass duct simultaneously and to selectively direct the primary air flow through the gas generator means only without by-pass air flow, and a variable means in said outlet section to selectively recombine the secondary by-pass air flow with the primary air flow in the outlet section when said variable inlet means are adjusted to selectively direct both the primary air flow through the gas generator and the secondary by-pass air flow through the by-pass duct simultaneously.

2. A reaction powerplant comprising, a casing defining a passage having a forwardly directed supersonic air inlet section and a rearwardly directed converging-diverging outlet section, a gas generator means disposed in the passage and spaced from the casing to define a by-pass duct, variable means in said inlet section to selectively direct a primary air flow through the gas generator means together with a secondary by-pass air flow through the by-pass duct simultaneously and to selectively direct the primary air flow through the gas generator means only without by-pass air flow, and a variable means in said outlet section to selectively recombine the secondary by-pass air flow with the primary air flow in the outlet section when said variable inlet means are adjusted to selectively direct both the primary air flow through the gas generator and the secondary by-pass air flow through the by-pass duct simultaneously.

3. Apparatus as defined in claim 2 wherein the inlet section is an internal compression inlet.

4. A reaction powerplant comprising, a casing defining a passage having a forwardly directed converging-diverging supersonic air inlet section and a converging-diverging rearwardly directed outlet section, a gas generator means disposed in the passage and spaced from the casing to define a by-pass duct, variable means in said inlet section to selectively direct a primary air flow through the gas generator means together with a secondary by-pass air flow through the by-pass duct simultaneously and to selectively direct the primary air flow through the gas generator means only without by-pass air flow, and a variable means in said outlet section to selectively recombine the secondary by-pass air flow with the primary air flow in the outlet section when said variable inlet means are adjusted to selectively direct both the primary air flow through the gas generator and the secondary by-pass air flow through the by-pass duct simultaneously.

5. Apparatus as defined in claim 4, wherein the variable means in the inlet section for directing part of the inlet air is located in the converging portion of the inlet section.

6. Apparatus as defined in claim 4, wherein the variable means in the inlet section for directing part of the inlet air is located in the diverging portion of the inlet section.

7. A reaction powerplant comprising a casing defining a passage having a forwardly directed converging-diverging supersonic air inlet section and a converging-diverging rearwardly directed fixed outlet section, a gas generator means disposed in the passage and spaced from the casing to define a by-pass duct, variable means in said inlet section to selectively direct part of a primary air flow through a by-pass duct, and a variable means in said outlet section to selectively recombine the by-pass with the primary air flow in the outlet section.

8. Apparatus as defined in claim 7 wherein the variable means in the inlet section for directing part of the inlet air is located in the converging portion of the inlet section.

9. Apparatus as defined in claim 7 wherein the variable means in the inlet section for directing part of the inlet air is located in the diverging portion of the inlet section.

10. A reaction powerplant comprising a casing defining a passage having a forwardly directed fixed capture area supersonic air inlet section and a converging-diverging rearwardly directed fixed exit area, a gas generator means disposed in the passage and spaced from the casing to define a by-pass duct, variable area nozzle outlet means on the gas generator discharging into the first-mentioned outlet section, variable means in said inlet section to selectively direct a part of a primary air flow through the by-pass duct, and a variable means in said outlet section upstream of the fixed exit area to selectively recombine the secondary by-pass air flow with the primary air flow in the outlet section.

11. A reaction powerplant comprising a casing defining a passage having a forwardly directed fixed capture area converging-diverging supersonic air inlet section and a converging-diverging rearwardly directed fixed exit area outlet section, a gas generator means disposed in the passage and spaced from the casing to define a by-pass duct, variable area nozzle outlet means on the gas generator discharging into the first-mentioned outlet section, variable means in said inlet section to selectively direct a part of a primary air flow through the by-pass duct, and a variable means in said outlet section upstream of the fixed exit area to selectively recombine the secondary by-pass air flow with the primary air flow in the outlet section.

12. Apparatus as defined in claim 11, wherein the variable means in the inlet section for directing part of the inlet air is located in the converging portion of the inlet section.

13. Apparatus as defined in claim 11, wherein the variable means in the inlet section for directing part of the inlet air is located in the diverging portion of the inlet section.

References Cited in the file of this patent

UNITED STATES PATENTS

| | | |
|---|---|---|
| 2,575,682 | Price | Nov. 20, 1951 |
| 2,587,649 | Pope | Mar. 4, 1952 |
| 2,589,945 | Leduc | Mar. 18, 1952 |
| 2,841,955 | McLafferty | July 8, 1958 |
| 2,850,873 | Hausmann | Sept. 9, 1958 |
| 2,853,854 | Avery | Sept. 30, 1958 |
| 2,861,419 | Hausmann | Nov. 25, 1958 |
| 2,900,789 | Philpot | Aug. 25, 1959 |
| 2,920,446 | Ranard | Jan. 12, 1960 |

FOREIGN PATENTS

| | | |
|---|---|---|
| 1,086,315 | France | Aug. 11, 1954 |
| 1,140,440 | France | Mar. 4, 1957 |
| 1,150,986 | France | Feb. 24, 1958 |
| 140,860 | Sweden | June 16, 1953 |